(12) United States Patent
Smigaj et al.

(10) Patent No.: US 10,375,944 B2
(45) Date of Patent: Aug. 13, 2019

(54) CONVERTIBLE FISHING ROD CARRIER

(71) Applicant: TRXSTLE, LLC, Olympia, WA (US)

(72) Inventors: John T. Smigaj, Tumwater, WA (US); Morgan A. Misek, Olympia, WA (US)

(73) Assignee: Trxstle, LLC, Olympia, WA (US)

( * ) Notice: Subject to any disclaimer, the term of this patent is extended or adjusted under 35 U.S.C. 154(b) by 0 days.

(21) Appl. No.: 15/979,870

(22) Filed: May 15, 2018

(65) Prior Publication Data
US 2019/0110456 A1 Apr. 18, 2019

Related U.S. Application Data

(60) Provisional application No. 62/572,799, filed on Oct. 16, 2017.

(51) Int. Cl.
*A01K 97/08* (2006.01)
*B60R 9/08* (2006.01)

(52) U.S. Cl.
CPC ............. *A01K 97/08* (2013.01); *B60R 9/08* (2013.01)

(58) Field of Classification Search
CPC ......... A01K 97/08; B60R 9/08; B65D 21/086
USPC .................. 43/26, 21.2; 206/315.11; 220/8; 224/922; 24/132 WL
See application file for complete search history.

(56) References Cited

U.S. PATENT DOCUMENTS

| | | | | |
|---|---|---|---|---|
| 1,467,834 A * | 9/1923 | Bruch | ................ | B60R 13/00 248/514 |
| 2,143,720 A * | 1/1939 | Smith | ................ | A01K 97/08 220/8 |
| 2,171,053 A * | 8/1939 | White | ................ | B60R 9/12 224/317 |
| 2,248,170 A * | 7/1941 | Hansen | ................ | B60R 9/02 224/546 |
| 2,552,879 A * | 5/1951 | Woerner | ................ | B60R 9/08 211/70.8 |
| 3,349,512 A * | 10/1967 | Walker | ................ | A01K 97/08 43/26 |
| 3,624,948 A * | 12/1971 | Baker | ................ | A01K 97/08 43/26 |
| 3,662,933 A * | 5/1972 | Michal | ................ | B60R 9/08 224/315 |
| 3,772,819 A * | 11/1973 | Ratzlaff | ................ | A01K 97/08 43/26 |
| 3,927,486 A * | 12/1975 | Yuen | ................ | A01K 87/00 43/20 |

(Continued)

OTHER PUBLICATIONS

U.S. Receiving Office, International Search Report and Written Opinion of the International Searching Authority, in PCT/US2018/056145, dated Dec. 26, 2018, which is the international application to this U.S. application.

*Primary Examiner* — Magdalena Topolski
(74) *Attorney, Agent, or Firm* — Kolitch Romano LLP

(57) ABSTRACT

Convertible fishing rod carriers may include an elongate telescoping portion configured to house one or more fishing rods and an enlarged housing configured to accommodate reels of the one or more fishing rods. Carriers described herein may be convertible between a portable configuration, in which the carrier maybe transported by hand, and a mounted configuration, in which the carrier is secured to a vehicle rack. In the mounted configuration, some examples include a locking feature configured to prevent removal of the carrier from the rack.

15 Claims, 10 Drawing Sheets

(56) References Cited

U.S. PATENT DOCUMENTS

| | | | |
|---|---|---|---|
| 4,523,704 A * | 6/1985 | Washington | B60R 9/055 224/328 |
| 4,546,877 A * | 10/1985 | Evans | A01K 97/08 206/315.1 |
| 4,572,416 A * | 2/1986 | Upham | B60R 9/08 224/326 |
| 4,707,892 A * | 11/1987 | Nelson | A01K 97/08 24/336 |
| 5,005,743 A * | 4/1991 | Ramsay | A45C 7/0031 190/104 |
| 5,259,140 A * | 11/1993 | Epperson | A01K 87/025 43/18.1 CT |
| 5,341,590 A * | 8/1994 | Hepworth | A01K 97/08 206/315.11 |
| 5,450,956 A * | 9/1995 | Peckenpaugh, Sr. | A01K 97/08 206/315.11 |
| 5,556,221 A | 9/1996 | Brunner | |
| 5,791,610 A * | 8/1998 | Sanchez | F41B 5/14 224/916 |
| 5,992,717 A * | 11/1999 | Clewes | A01K 97/10 224/200 |
| 6,408,564 B1 * | 6/2002 | Murphy | A01K 97/08 43/26 |
| 6,584,725 B1 * | 7/2003 | Elam | A01K 97/08 43/21.2 |
| 6,760,994 B2 | 7/2004 | Henault et al. | |
| 7,877,922 B1 | 2/2011 | Petrie et al. | |
| D653,446 S | 2/2012 | Bode | |
| 8,650,796 B1 * | 2/2014 | Bates | A01K 97/08 206/315.11 |
| 2002/0178642 A1 * | 12/2002 | Garcia | A01K 97/08 43/26 |
| 2004/0211801 A1 | 10/2004 | Barbara | |
| 2007/0113463 A1 * | 5/2007 | Duncan | A01K 97/08 43/26 |
| 2007/0119888 A1 | 5/2007 | Chuang | |
| 2007/0266616 A1 * | 11/2007 | Rienzo | A01K 97/10 43/21.2 |
| 2009/0039231 A1 * | 2/2009 | McLaughlin | A01K 97/08 248/535 |
| 2011/0179692 A1 * | 7/2011 | McKnight | A01K 97/08 43/21.2 |
| 2012/0227309 A1 * | 9/2012 | Fanelli | A01K 97/08 43/26 |
| 2013/0255132 A1 | 10/2013 | Sela | |
| 2015/0327530 A1 * | 11/2015 | Langley | A01K 99/00 43/26 |
| 2016/0073618 A1 * | 3/2016 | Smith | A01K 87/02 403/286 |
| 2017/0036614 A1 * | 2/2017 | Rahman | B60R 9/058 |
| 2018/0070573 A1 * | 3/2018 | Harris | B60R 9/08 |
| 2018/0132584 A1 * | 5/2018 | Boyles | A45F 3/15 |

\* cited by examiner

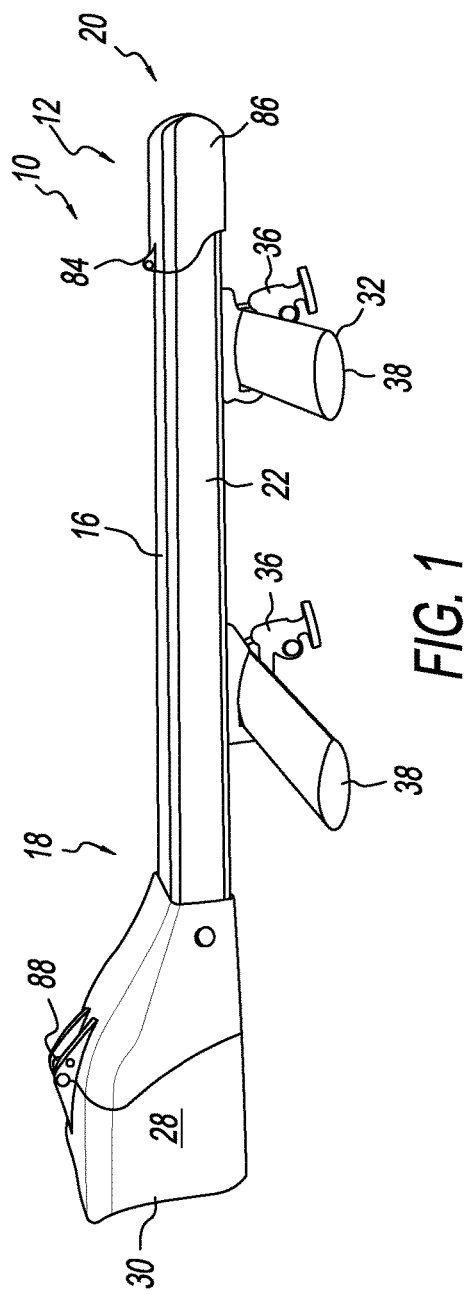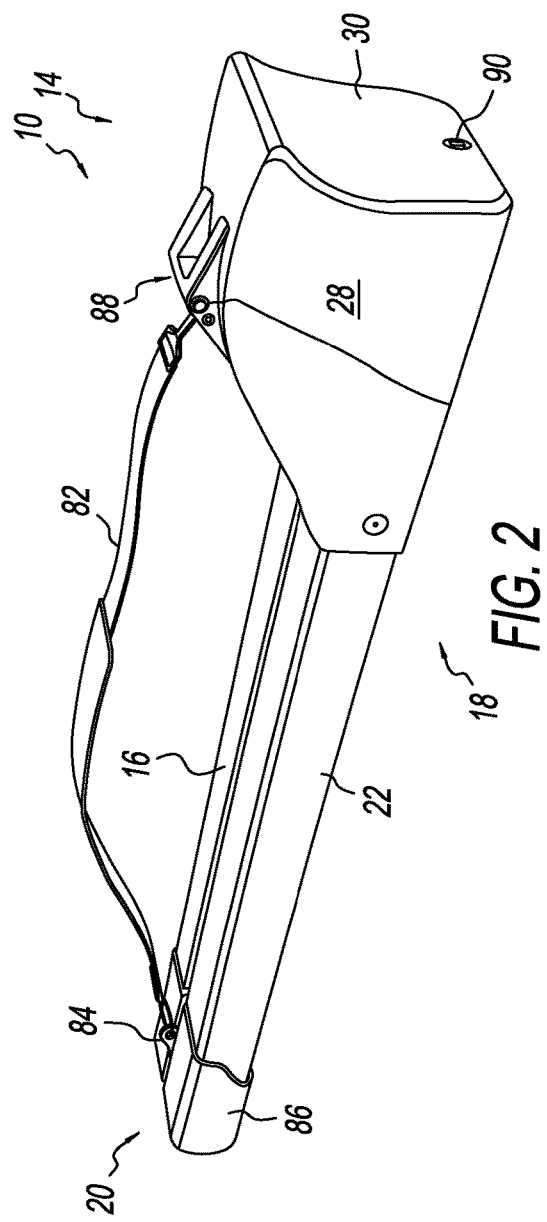

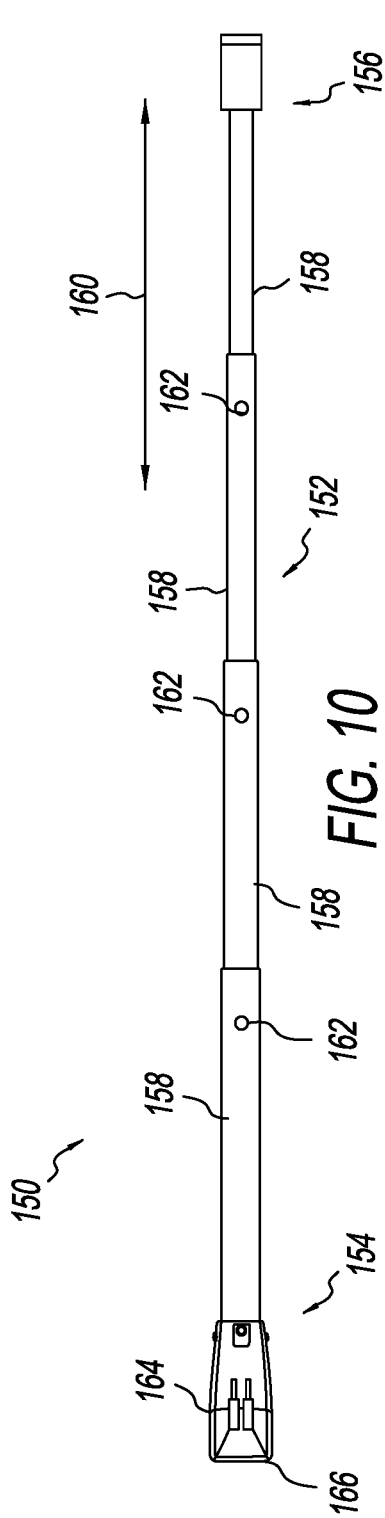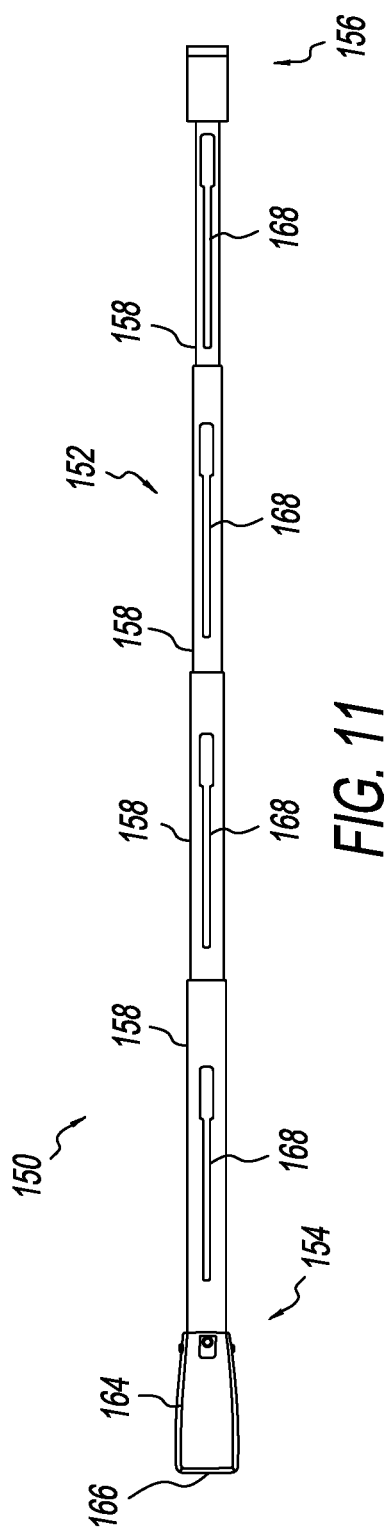

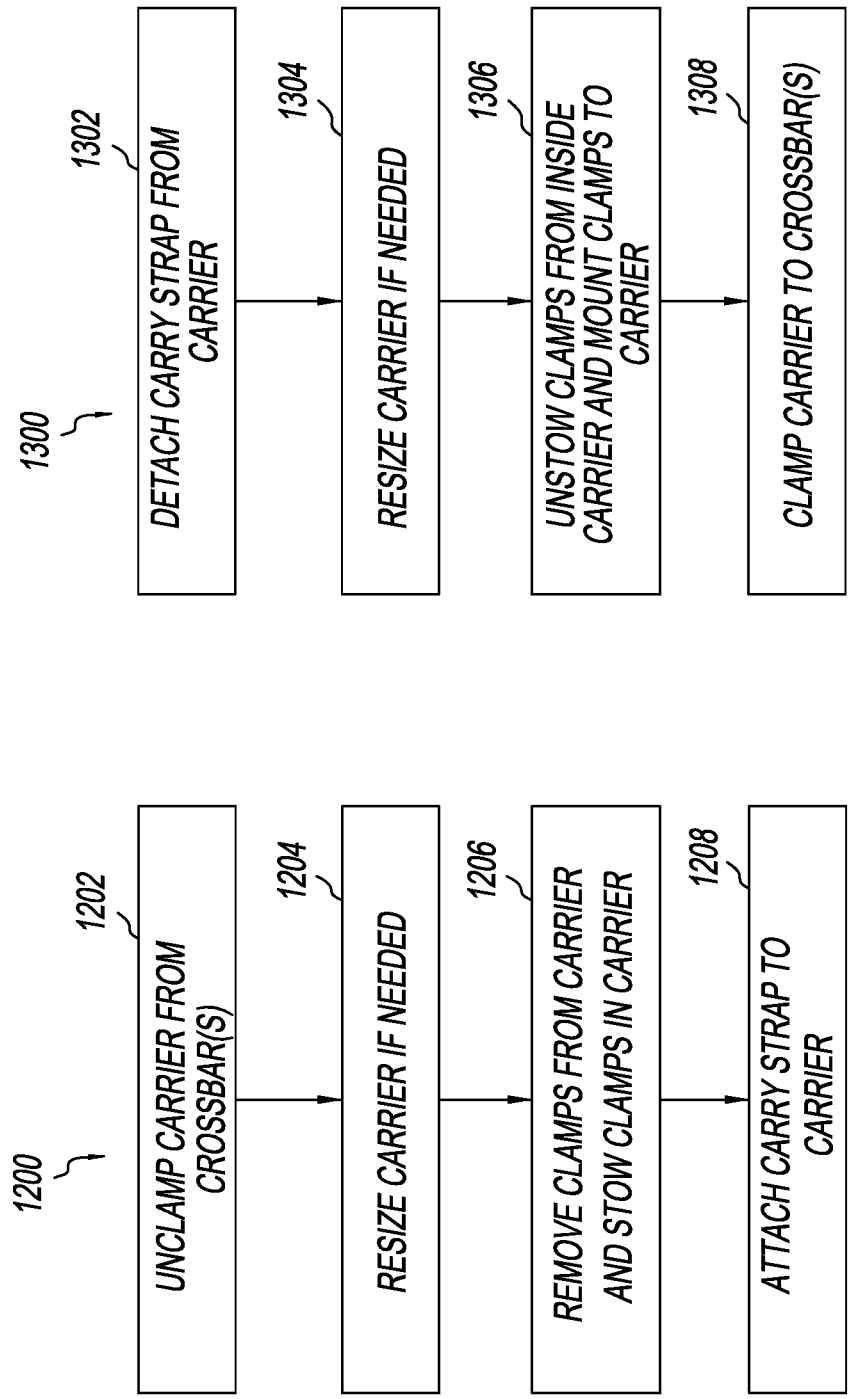

CONVERTIBLE FISHING ROD CARRIER

CROSS-REFERENCES

This application claims the benefit under 35 U.S.C. § 119(e) of the priority of U.S. Provisional Patent Application Ser. No. 62/572,799, filed Oct. 16, 2017, the entirety of which is hereby incorporated by reference for all purposes.

FIELD

This disclosure generally relates to carrying cases for fishing rods. Specifically, the present disclosure relates to convertible fishing rod carrier assemblies.

INTRODUCTION

A variety of carrier assemblies or cases for the storage and transportation of fishing rods are available. These cases, however, are typically designed to accommodate a single mode of transport. For example, some cases are designed to mount to a car-top rack and are cumbersome to carry by hand, whereas others are more convenient to be carried by hand, but cannot be mounted to a car-top rack without the use of additional equipment. Accordingly, there is a need for carrying cases that can be used conveniently to carry a fishing rod both by hand and on a car-top rack.

SUMMARY

The present disclosure provides systems, apparatuses, and methods relating to convertible fishing rod carriers.

In some embodiments, a convertible carrier for fishing rods may include: an elongate body portion having a first end, a closed second end, and an outer housing defining a hollow interior extending axially from the first end to the second end, the outer housing including a plurality of telescoping tubular segments, such that the body portion is axially collapsible and extendable; a door disposed at the first end of the body portion, the door configured to selectively permit access to the interior of the body portion; at least one crossbar clamp; and a carrying strap removably attachable to an exterior of the body portion; wherein the carrier is convertible between a mounted configuration, in which the at least one crossbar clamp couples the body portion to a crossbar of a vehicle rack, and a portable configuration, in which the elongate body portion is collapsed, the at least one crossbar clamp is stowed in the carrier, and the carrying strap is coupled to the exterior of the body portion.

In some embodiments, a convertible carrier for fishing rods may include: an elongate body portion having a plurality of telescoping tubular segments, such that an effective length of the body portion is selectively variable; an inner lining coupled to the elongate body portion and configured such that an elongate object stowed within the body portion is separated from the tubular segments by the inner lining; a housing coupled to an open end of the elongate body portion, the housing having a larger perimeter than each of the tubular segments; a door pivotably coupled to the housing and configured to control access to an interior of the housing and the elongate body portion; and a crossbar clamp selectively attachable to the elongate body portion; wherein the carrier is convertible between a mounted configuration, in which the crossbar clamp couples the body portion to a crossbar of a vehicle rack, and a portable configuration, in which the elongate body portion is collapsed, the crossbar clamp is stowed in the carrier, and a carrying strap is coupled to the carrier.

In some embodiments, a method for stowing one or more fishing rods may include: resizing an effective length of a fishing rod carrier comprising a plurality of telescoping tubular segments extending from a reel housing; securing the fishing rod carrier to a vehicle rack by clamping one or more crossbar clamps of the carrier to a crossbar of the vehicle rack; inserting a fishing rod into the fishing rod carrier via a hinged door on the reel housing, such that a rod portion of the fishing rod is disposed within the tubular segments and a reel portion of the fishing rod is disposed within the reel housing; and securing the fishing rod within the fishing rod carrier by locking the door of the reel housing using an integrated locking mechanism; wherein inserting the fishing rod into the fishing rod carrier further comprises placing a rod portion of the fishing rod into a continuous interior lining coupled to the tubular segments.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is an isometric view of an illustrative fishing rod carrier in a mounted configuration.

FIG. 2 is an isometric view of the fishing rod carrier of FIG. 1 in a portable configuration.

FIG. 10 is a top plan view of another illustrative fishing rod carrier in an extended configuration.

FIG. 11 is a bottom plan view of the fishing rod carrier of FIG. 10.

FIG. 12 is a flow chart depicting steps in a first illustrative method for using fishing rod carriers in accordance with aspects of the present disclosure.

FIG. 13 is a flow chart depicting steps in a second illustrative method for using fishing rod carriers in accordance with aspects of the present disclosure.

DETAILED DESCRIPTION

Figure 3:
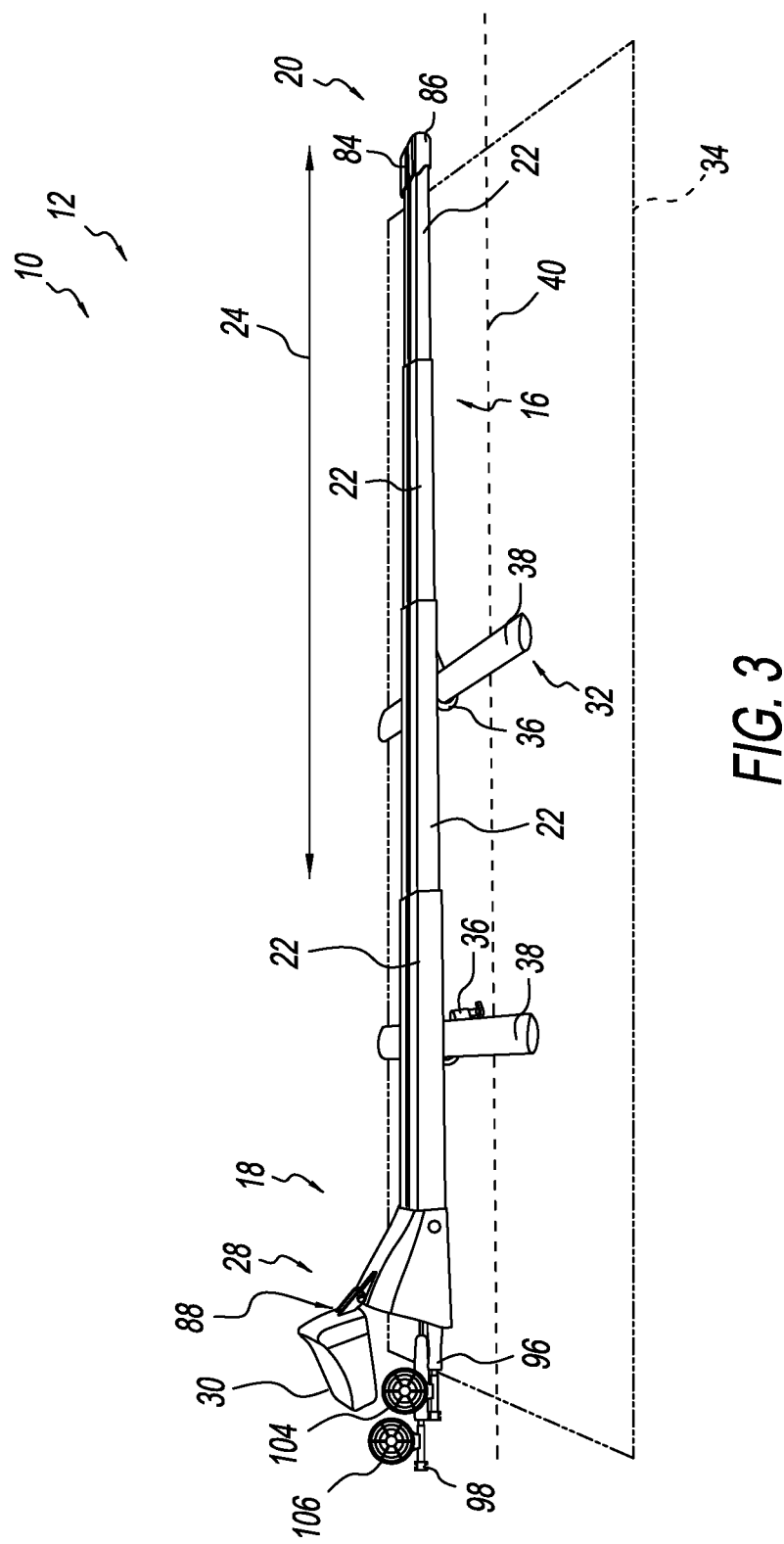
FIG. 3 is a side view of the fishing rod carrier of FIG. 1, in a mounted and extended configuration.

Various aspects and examples of a convertible fishing rod carrier, as well as related methods, are described below and illustrated in the associated drawings. Unless otherwise specified, a convertible carrier assembly for carrying fishing rods in accordance with the present teachings, and/or its various components, may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through D, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," and "aft" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

Overview

In general, a convertible fishing rod carrier (also referred to as a case) may include a plurality of tubular segments coaxially disposed in a telescoping arrangement, such that the carrier assembly is transitionable between a collapsed configuration and at least one extended configuration. Furthermore, in some examples the carrier is convertible between a portable configuration, in which the compact carrier can be transported using a shoulder strap or the like, and a vehicle mounted configuration, in which the carrier is secured to a vehicle rack (e.g., a roof rack) using one or more crossbar clamps. The one or more crossbar clamps may be selectively attachable to the carrier via corresponding keyhole slots. In some examples, each of the clamps may comprise a clamshell-type clamp having three jaw portions: upper and lower jaws for clamping onto the crossbar, and an additional jaw for clamping onto the carrier. All three jaws may be operated by a single actuator.

The carrier may include an enlarged end portion having a door for selective access to an interior of the carrier. One or more fishing rods, e.g., in a disassembled state, may be inserted into the carrier via the open door. When a fishing rod is the item being stowed, a reel portion of the rod may be housed in the enlarged end portion, while the rod portion(s) are housed in the elongate tubular segments.

Examples, Components, and Alternatives

The following sections describe selected aspects of exemplary convertible fishing rod carriers, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. First Illustrative Fishing Rod Carrier

As shown in FIGS. 1-9, this section describes an illustrative double-barreled fishing rod carrier 10. Carrier 10 is an example of the fishing rod carrier described in the Overview, above.

Figure 4:
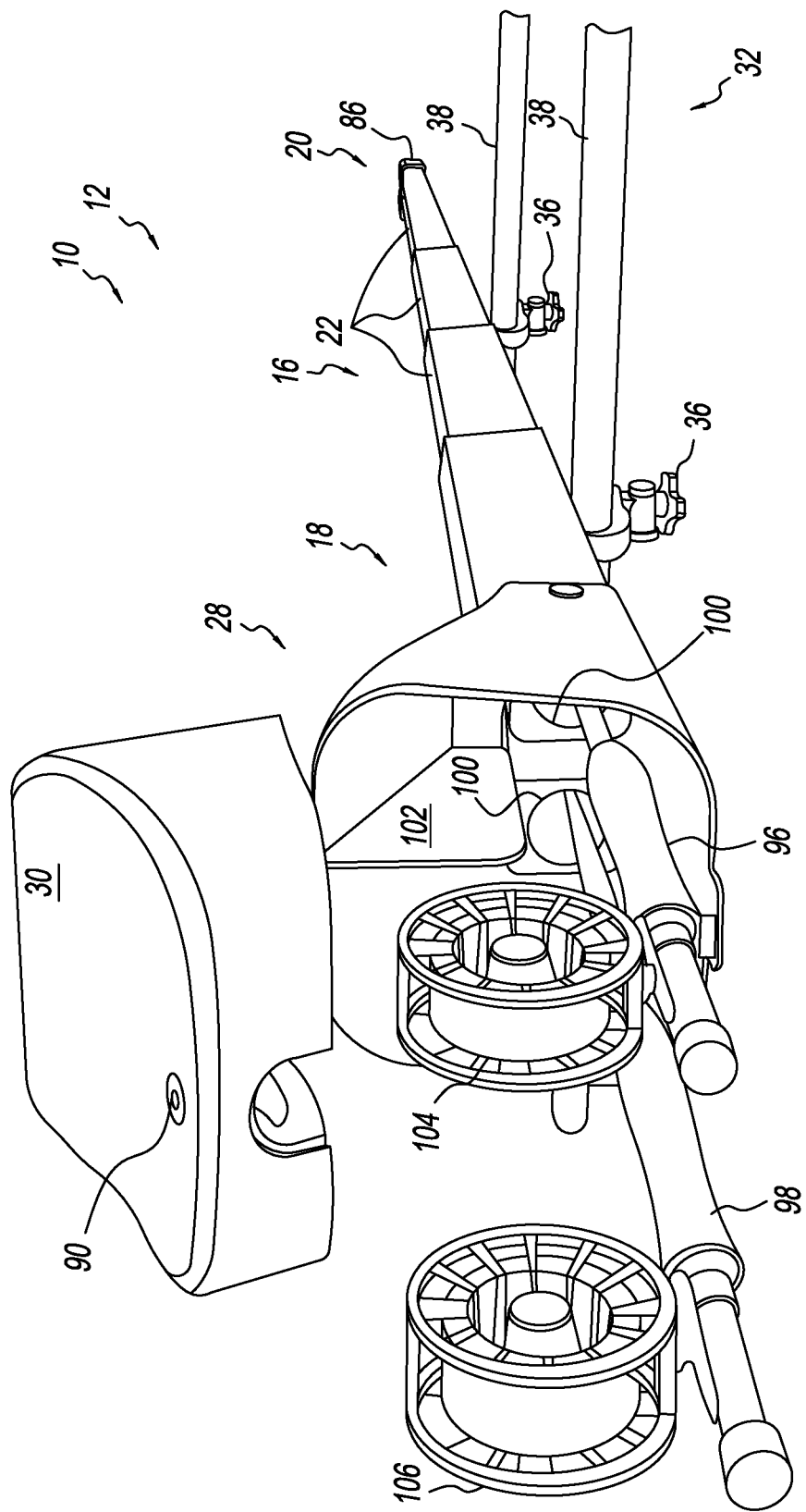
FIG. 4 is a perspective view of the fishing rod carrier of FIG. 1, in a mounted and extended configuration.

FIG. 1 is an isometric view of carrier 10 in a first configuration, also referred to as a mounted configuration 12. FIG. 2 is an isometric view of carrier 10 in a second configuration, also referred to as a portable configuration 14. FIG. 3 depicts carrier 10 in mounted configuration 12 and also in an extended configuration. This is in contrast to the collapsed configurations of FIGS. 1 and 2. FIG. 4 is another view of the extended version of mounted configuration 12.

With continuing reference to FIGS. 1-4, carrier 10 includes an elongate body 16, having an open first end 18 and a closed second end 20. Body 16 includes a plurality of nested tubular segments 22 (here, four) arranged in a telescoping configuration. Accordingly, body 16 may be extendable and collapsible, thereby changing the effective length of the carrier, as indicated by arrow 24 in FIG. 3. This telescoping extendability is facilitated by detent mechanisms (not shown—see corresponding example in FIG. 10) formed in top surfaces of each segment 22 (in some examples, the detent mechanisms may be located on a side other than the top). The detent mechanisms comprise a spring-loaded (or otherwise biased) pushbutton or boss on one segment 22 and a corresponding aperture (i.e., opening) in an adjacent segment 22, where the boss is configured to pop up into the aperture when aligned, thereby preventing axial relative motion of the segments. The user may then manually press the boss down to cause it to exit the aperture, freeing the segments to slide past each other. In some examples, the detent mechanisms are configured such that when carrier 10 is in a collapsed state, all of the detents are aligned with a single detent opening in the outermost tubular segment 22. That detent openings, together with the aligned bosses, serve as releasable fastening mechanisms for the telescoping segments. The fastening mechanism may include a keyed lock (not shown) operable for enabling or disabling release of the segments.

Segments 22 may include any suitable tubular structures configured to be extended and collapsed in a telescoping manner. Segments 22 may have any suitable length and/or cross-sectional shape, and any suitable number of the segments may be included. In this example, four segments 22 are included, each being less than approximately thirty inches in length and having a generally (rounded) rectangular cross section. Carrier 10 may be placed into several extended states, from completely collapsed to completely extended, and including at least one intermediate length. Accordingly, an effective length of carrier 10 may be configured by the user to accommodate a length of the stored item.

A reel housing 28 is located at first end 18 of body 16 of the carrier. Reel housing 28 may include any suitable structure configured to enclose an enlarged portion of the contents of the carrier, e.g., a fishing rod reel, and to provide access to the interior of the carrier. Accordingly, in this example, reel housing 28 comprises an enlarged container having a pivotable access door 30. In this example, access door 30 has a top hinge, such that the door is configured to be pivoted upward, relative to a vehicle on which the carrier is mounted.

To further facilitate rooftop (or other surface) mounting on a vehicle, housing 28 is generally coplanar with a lower side of body 16, while housing 28 expands upward to create the enlarged interior space that accommodates the fishing rod reel(s). All directions are relative to a host vehicle on which the carrier may be mounted.

As shown in FIG. 3, carrier 10 may be mounted to a rack 32 of a vehicle 34, using one or more included crossbar clamps 36. Each crossbar clamp 36 is configured to be secured to both the carrier and a crossbar 38 of rack 32. Accordingly, carrier 10 is configured to be mounted parallel to a long axis 40 of vehicle 34, such that the carrier produces relatively lower wind resistance and door 30 is accessible from either the front or the rear of the vehicle.

Figure 5:
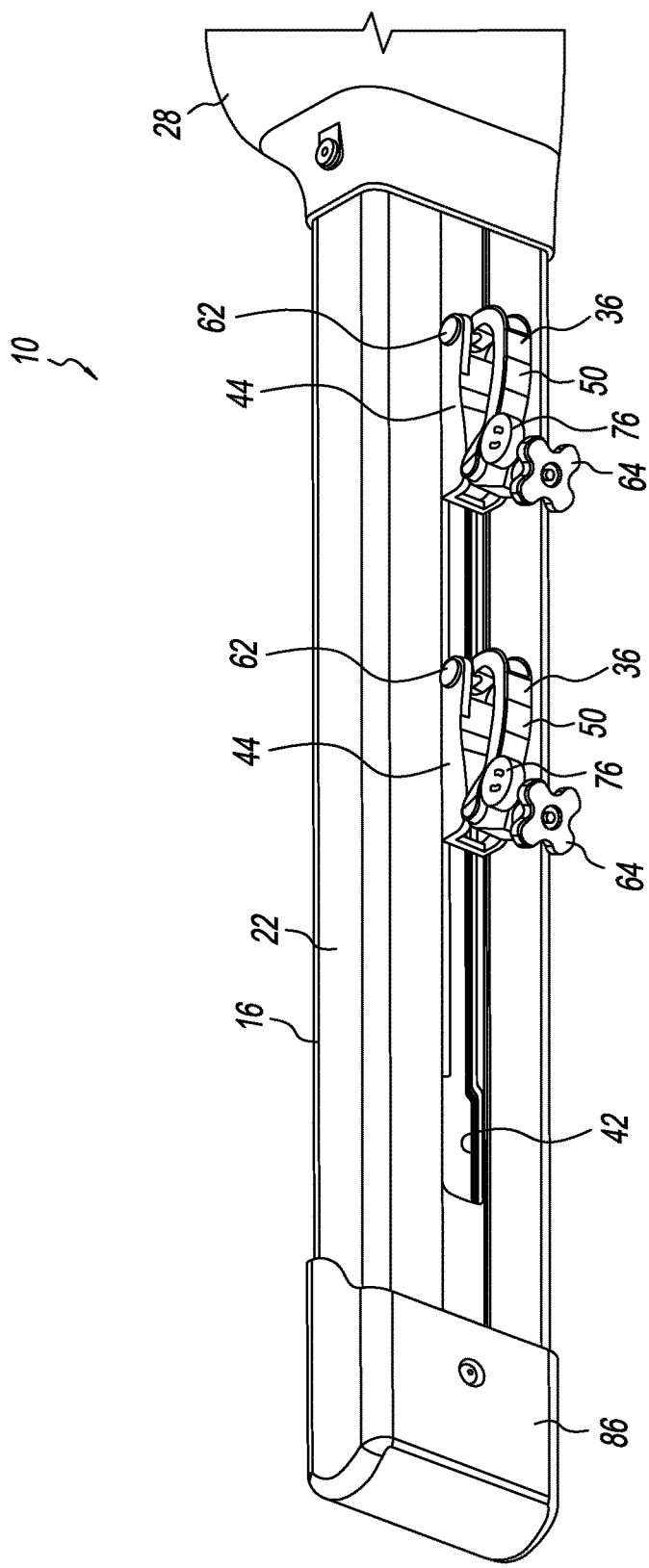
FIG. 5 is a bottom isometric view of the fishing rod carrier of FIG. 1, in a collapsed configuration, showing two illustrative crossbar clamps coupled thereto.

Turning to FIGS. 4 and 5, crossbar clamps 36 and related features will now be described in further detail. As best seen in FIG. 4 (see FIG. 11 for another example), bottom surfaces of segments 22 (e.g., of each of the segments) include respective slots 42 formed through the wall of body portion 16. In this example, slots 42 are keyhole slots, although the slots may have other suitable shapes. Slots 42 are configured to receive an upper portion of crossbar clamp 36, as described below. The keyhole shape facilitates insertion of the upper portion of the crossbar clamp into the enlarged end of the slot, then sliding the crossbar clamp along the slot until it is laterally captured by the narrower part of the slot.

Crossbar clamp 36 is a clamshell-type clamp, having a pair of pivoting jaws that open at one end to engage the crossbar. The jaws are then closed onto the crossbar using an actuator. Specifically, as best viewed in FIG. 5, crossbar clamp 36 includes a first jaw 44 having a substantially planar (upper) first portion 46 and a curved (lower) second portion 48 configured to engage a top surface of the crossbar of the vehicle rack. Crossbar clamp 36 further includes a second jaw 50 configured to engage a lower surface of the crossbar. A proximal end portion 52 of second jaw 50 is pivotably coupled to a proximal end portion 54 of first jaw 44. Unlike standard clamshell clamps, crossbar clamp 36 further includes a third jaw 56 having a flange portion 58 disposed opposite upper first portion 46 of first jaw 44. A proximal end portion 58 of the third jaw is pivotably coupled to the proximal end portions of the first and second jaws. Here, for example, all three jaws share a common pivot axle 62.

Crossbar clamp 36 is operated using a clamp actuator 64 configured to selectively urge a distal end portion 66 of second jaw 50 toward a distal end portion 68 of first jaw 44. Actuator 64 simultaneously urges distal end portion 68 of first jaw 44 toward a distal end portion 70 of third jaw 56. Accordingly, the crossbar clamp is configured to engage slot 42 by pinching a perimeter of the slot between planar first portion 46 of first jaw 44 and flange portion 58 of third jaw 56. As described above, flange portion 58 is configured to be inserted into the large end of the keyhole slot, then slid along the narrow portion of the slot to a desired axial location.

Actuator 64 may include any suitable clamp actuation device. In this example, actuator 64 is a lockable, knob-style actuator having a manual knob 72 engaged on a first end of a threaded rod 74, the threaded rod pivotably coupled at a second end to distal end portion 70 of third jaw 56. A locking device 76 is configured to prevent rotation of knob 72 on threaded rod 74. In some examples, the locking device may instead disengage the knob from the threaded rod. When crossbar clamp 36 is clamped onto crossbar 38 and onto the perimeter of slot 42, locking the clamp using locking device 76 prevents removal of the carrier from the vehicle rack (i.e., by maintaining the clamp in a clamped state on both the crossbar and the carrier). Crossbar clamps 36 may be included with a portable or a non-portable version of the carrier, and may be utilized for coupling any suitable rack-mounted accessory to a crossbar.

In some examples, carrier 10 may be configured to remain in mounted configuration 12, i.e., carrier 10 may be non-portable. This may be the case, for example, when carrier 10 is too large for a person to reasonably carry. In other examples, carrier 10 may be transitionable back and forth between configuration 12 and portable configuration 14.

Carrier 10 may be transported manually when in portable configuration 14, e.g., by hand, using a handle, using a shoulder strap, and/or using any other device suitable for transporting the carrier in its collapsed state. As shown in FIG. 2, a carrying strap 82 may be coupled to carrier 10 in portable configuration 14. This may be accomplished by clipping or otherwise securing opposing ends of the strap to corresponding attachment point 84 on an end cap 86 at closed end 20 and attachment point 88 on housing 28. Carrying strap 82 may include any suitable flexible strap, and may comprise any suitable material. In some examples, carrying strap 82 has an adjustable length. In some examples, carrying strap 82 includes a padded portion for carrying on the shoulder, etc. When not in use, carrying strap 82 may be stowed in carrier 10.

Figure 6:
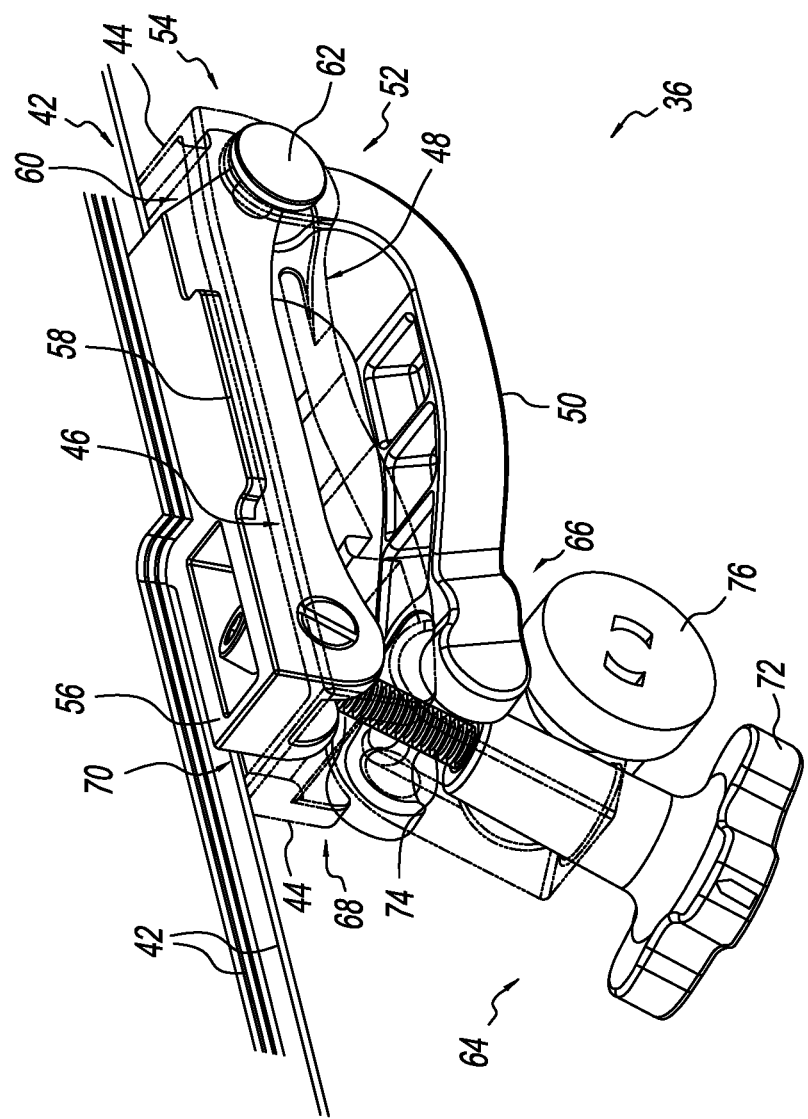
FIG. 6 is an isometric view of an illustrative crossbar clamp suitable for use with fishing rod carriers disclosed herein.
Figure 7:
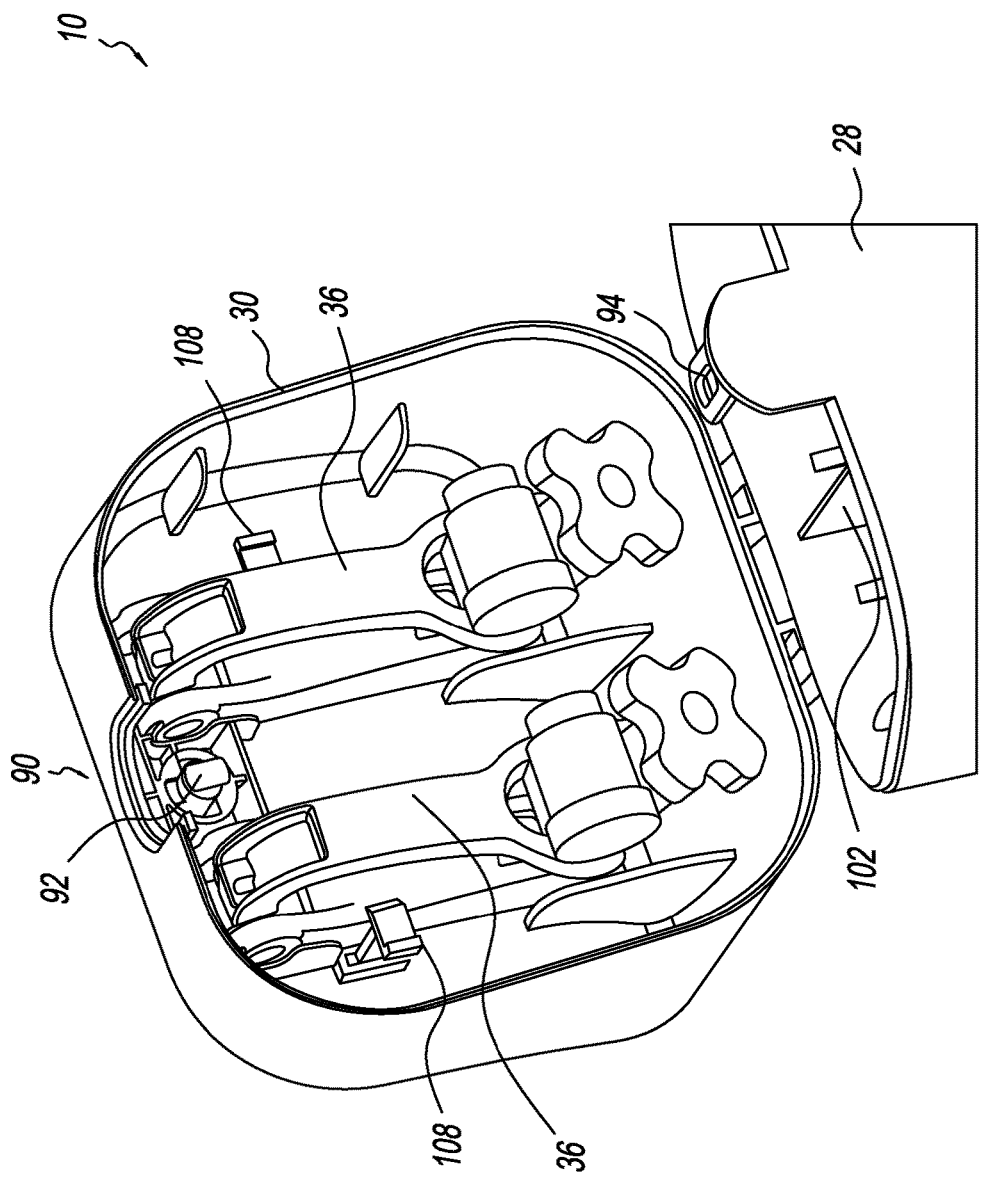
FIG. 7 is an isometric view of an interior portion of an access door of the fishing rod carrier of FIG. 1.

With reference to FIG. 4 and FIG. 6, access door 30 includes a keyed locking mechanism 90 configured to selectively secure the free end of door 30 to the body of the reel housing. Locking mechanism 90 may include any suitable lock, latch, or securement device. In this example, a rotatable cam 92 coupled to the door is configured to selectively engage a slot 94 formed in the reel housing.

Within reel housing 28, one or more storage enhancing features may be present. In this example, carrier 10 is configured to store two fishing rods 96, 98. Accordingly, an internal pair of side-by-side guiding apertures 100 are disposed at the transition between housing 28 and segments 22 of body 16. Additionally, in this example, a vertical divider 102 extends from an upper surface of reel housing 28, to facilitate physical separation of two fishing rod reels 104 and 106 housed therein.

As best viewed in FIG. 6, an inner surface of door 30 includes features configured to facilitate storage of one or more of crossbar clamps 36. Specifically, in this example, a pair of spring clips 108 protrude from the inner surface and are each configured to retain a respective crossbar clamp when carrier 10 is in the portable configuration.

Figure 8:
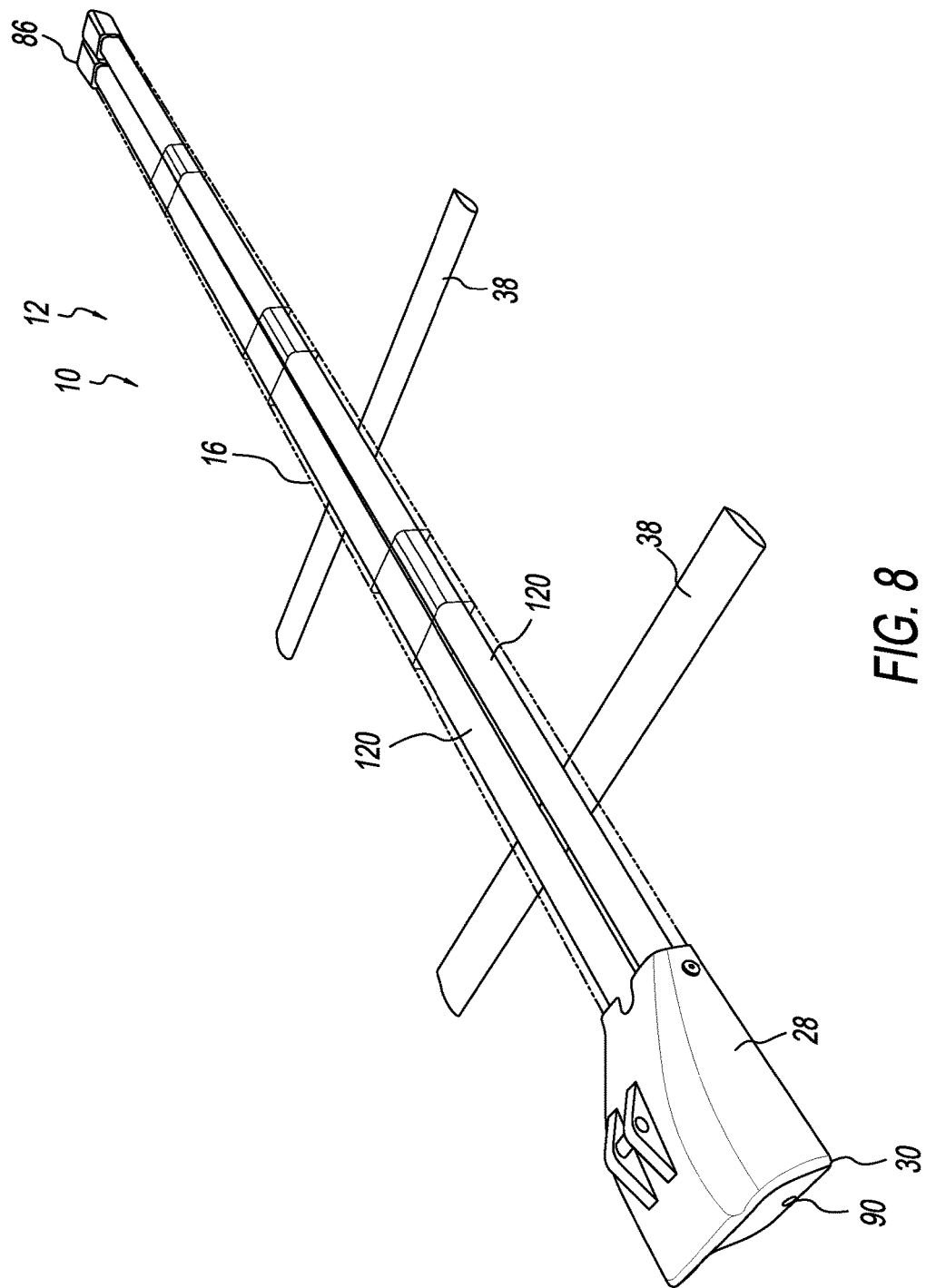
FIG. 8 is a perspective view of the fishing rod carrier of FIG. 1 in an extended configuration, showing selected internal components.
Figure 9:
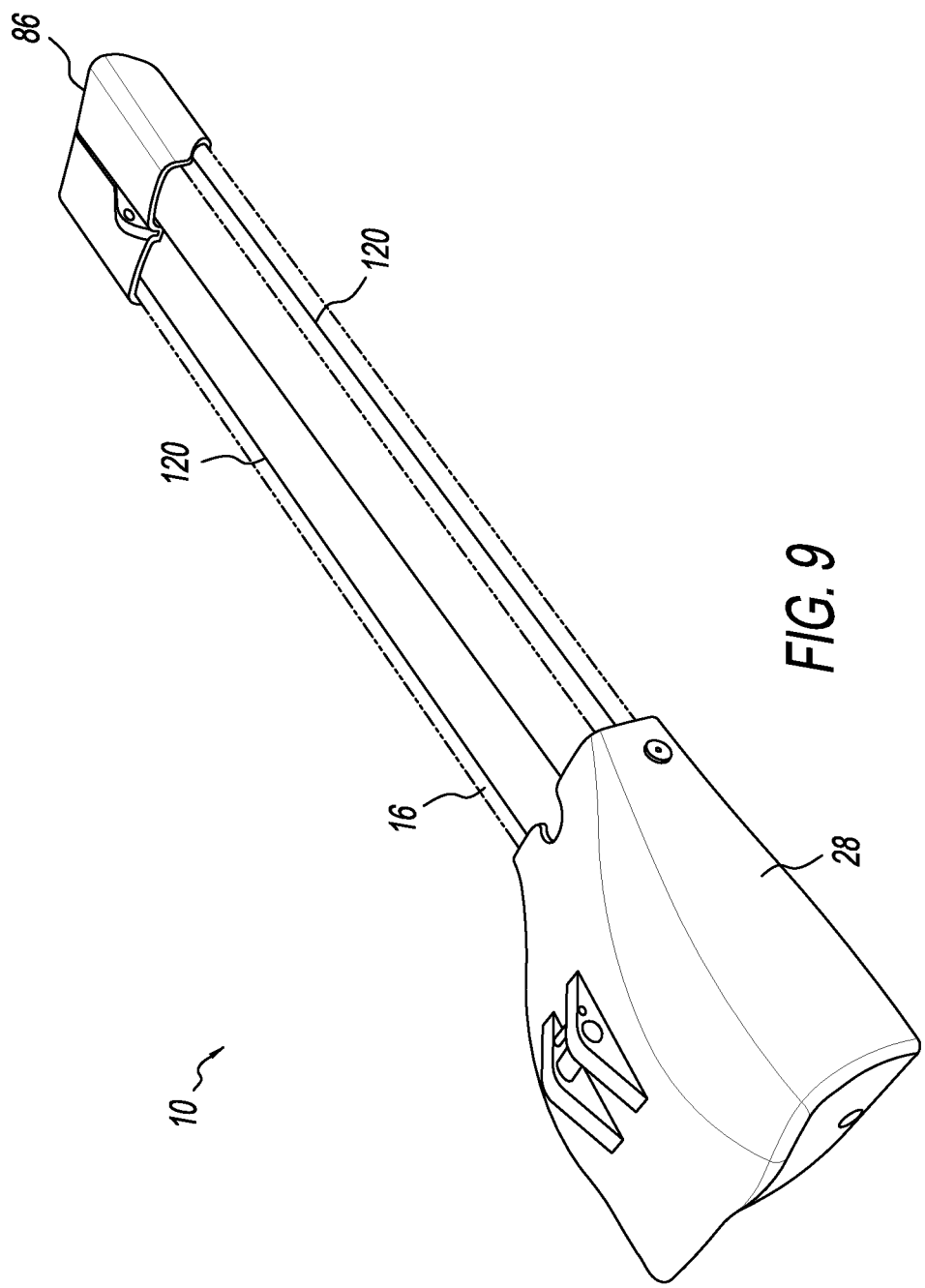
FIG. 9 is a perspective view of the fishing rod carrier of FIG. 1 in a collapsed configuration, showing selected internal components.

With reference now to FIGS. 8 and 9, carrier 10 further includes a tubular lining 120, also referred to as a protective sleeve, disposed in the hollow interior of segments 22, where the tubular lining is configured to enclose and protect one fishing rod (or other device) placed therein. In this example, where carrier 10 is configured for the stowage of two fishing rods, a pair of side-by-side tubular linings 120 is provided. Each tubular lining 120 may include any suitable pliant material configured to protect a fishing rod (or other device) housed therein.

In this example, each tubular lining 120 includes a tube of water-resistant, deformable material (e.g., latex) that lines the interior of the tubular segments to protect the item (e.g., a fishing rod) stored in carrier 10. Tubular lining 120 may be extendible and collapsible (e.g., in an elastic manner) and therefore configured to change its effective length (e.g., by stretching and relaxing, by accordion-style transitioning, etc.) when carrier 10 is extended and collapsed. Accordingly, tubular lining 120 lines the tubular segments regardless of the extended or collapsed state of body 16.

In some examples, only a first end portion and a second end portion of the tubular lining are coupled to the main body of the carrier. For example, one end of tubular lining 120 may be sealed (e.g., to increase protection against moisture and dirt) and each end of the lining may be affixed to the first and second ends of body 16 (e.g., using an adhesive). In some examples, end portions of tubular lining 120 are glued to respective plates, and the respective plates are affixed to first and second ends of body 16 (e.g., using bolts or other suitable fastening devices). Tubular lining 120 may further function to prevent moisture or dirt from entering the same space as the item stowed in carrier 10 via slots 42 (and/or other openings).

B. Second Illustrative Fishing Rod Carrier

As shown in FIGS. 10-11, this section describes an illustrative single-barreled fishing rod carrier 150. Carrier 150 is an example of the fishing rod carrier described in the Overview, above. Carrier 150 is substantially similar to carrier 10, described in Section A, although carrier 150 is configured to carry a single fishing rod or other elongate item (including such an item in a disassembled state), rather than two. Unless otherwise described below, corresponding components of carrier 150 are substantially as described with respect to carrier 10.

FIG. 10 is a top plan view of carrier 150 in an extended configuration. FIG. 11 is a bottom plan view of carrier 150. carrier 150 includes an elongate body 152 having an open first end 154 and a closed second end 156. Body 152 includes a plurality of nested tubular segments 158 (here, four) arranged in a telescoping configuration. Accordingly, body 152 may be extendable and collapsible, thereby changing the effective length of the carrier, as indicated by arrow 160 in FIG. 10. This telescoping extendability is facilitated by detent mechanisms 162 formed in top surfaces of each segment 158 (in some examples, the detent mechanisms may be located on a side other than the top).

Segments 158 may include any suitable tubular structures configured to be extended and collapsed in a telescoping manner. As with segments 22, segments 158 may have any suitable length and/or cross-sectional shape, and any suitable number of the segments may be included. In this example, four segments 158 are included, each being less than approximately thirty inches in length and having a generally (rounded) square cross section. Carrier 150 may be placed into several extended states, from completely collapsed to completely extended, and including at least one intermediate length. Accordingly, an effective length of carrier 150 may be configured by the user to accommodate a length of the stored item.

A reel housing 164 is located at first end 154 of body 152 of the carrier. Reel housing 164 may include any suitable structure configured to enclose an enlarged portion of the contents of the carrier, e.g., a fishing rod reel, and to provide access to the interior of the carrier. Accordingly, in this example, reel housing 164 comprises an enlarged container having a pivotable access door 166. Access door 166 has a top hinge, such that the door is configured to be pivoted upward, relative to a vehicle on which the carrier is mounted. Door 166 is substantially as described above, with respect to door 30, although no interior divider may be present, and only a single inner guiding aperture.

As depicted in FIG. 11, bottom surfaces of segments 158 (e.g., of each of the segments) include respective slots 168 formed through the wall of body portion 152. In this example, slots 168 are again keyhole slots configured to receive an upper portion of the included crossbar clamps (not shown). One or more crossbar clamps may be coupled to various ones of slots 168, to accommodate crossbar spacing on the vehicle rack and/or the extended length of the carrier.

C. Illustrative Method

This section describes steps of illustrative methods 1200 and 1300 for carrying one or more fishing rods; see FIGS. 12-13. Aspects of convertible fishing rod carriers described above may be utilized in the method steps described below. Where appropriate, reference may be made to components and systems that may be used in carrying out each step. These references are for illustration, and are not intended to limit the possible ways of carrying out any particular step of the method.

FIGS. 12 and 13 are flowcharts illustrating steps performed in illustrative methods, and may not recite the complete process or all steps of the respective method. Steps of the methods of FIGS. 12 and 13 may be combined. Although various steps of methods 1200 and 1300 are described below and depicted in FIGS. 12 and 13, the steps need not necessarily all be performed, and in some cases may be performed simultaneously or in a different order than the order shown.

With reference to FIG. 12, the carrier is first assumed to be disposed in a mounted configuration on a vehicle rack (e.g., see FIG. 1 and corresponding description). Step 1202 of method 1200 includes unclamping and removing the fishing rod carrier from the vehicle rack. This step may include unlocking the one or more crossbar clamps utilized to couple the carrier to the vehicle rack.

Step 1204 of method 1200 includes (optionally) resizing the carrier if needed. For example, one or more segments of the carrier body may be collapsed (or extended). This may include operating a detent mechanism on the respective segment.

Step 1206 of method 1200 includes removing the crossbar clamp(s) from the fishing rod carrier and stowing the crossbar clamp in an interior of the fishing rod carrier. For example, the crossbar clamps may be clipped onto an inner wall of the access door of the carrier (e.g., see FIG. 6 and accompanying description).

Step 1208 of method 1200 includes attaching a carrying strap to an exterior of the fishing rod carrier. For example, ends of a carrying strap may be clipped to corresponding attachment points on the carrier (e.g., see FIG. 2 and accompanying description). The carrier is now in a portable configuration.

Turning to FIG. 13, step 1302 of method 300 includes optionally detaching the carrying strap, if present. The carrying strap may be stowed inside the fishing rod carrier, if desired.

Step 1304 of method 1300 includes optionally resizing an effective length of the fishing rod carrier. For example, the carrier may be extended or collapsed as described above, to accommodate the item stored therein.

Step 1306 of method 1300 includes retrieving one or more crossbar clamps from an interior of the fishing rod carrier. For example, the clamp(s) may be unclipped from the inner wall of the carrier's access door. Step 1306 further includes installing the one or more crossbar clamps on the fishing rod carrier. This may be performed using any suitable method. For example, see FIGS. 4 and 5 and accompanying description.

Step 1308 of method 1300 includes securing the fishing rod carrier to a vehicle rack by clamping the one or more crossbar clamps to a crossbar of the vehicle rack. (See, e.g., FIGS. 1, 3, 7). Securing the fishing rod carrier to the vehicle rack may include locking the crossbar clamp using a locking mechanism integrated into the clamp. In some examples, locking the crossbar clamp automatically locks the clamp to the fishing rod carrier.

At any suitable point in either method, one or more fishing rods may be inserted into (or removed from) the fishing rod carrier via a hinged door on the reel housing. The fishing rod(s) may be stowed such that a rod portion of the fishing rod is disposed within the tubular segments and a reel portion of the fishing rod is disposed within the reel housing. Stowing the fishing rod(s) in the carrier may further include locking the door of the reel housing using an integrated locking mechanism. Disposing the fishing rod(s) in the fishing rod carrier may include placing a rod portion of each fishing rod into a respective continuous interior lining of the carrier.

D. Illustrative Combinations and Additional Examples

This section describes additional aspects and features of convertible carrier assemblies for carrying fishing rods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A convertible carrier for fishing rods, the carrier comprising:

an elongate body portion having a first end, a closed second end, and an outer housing defining a hollow interior extending axially from the first end to the second end, the outer housing including a plurality of telescoping tubular segments, such that the body portion is axially collapsible and extendable;

a door disposed at the first end of the body portion, the door configured to selectively permit access to the interior of the body portion;

at least one crossbar clamp; and a carrying strap removably attachable to an exterior of the body portion;

wherein the carrier is convertible between a mounted configuration, in which the at least one crossbar clamp couples the body portion to a crossbar of a vehicle rack, and a portable configuration, in which the elongate body portion is collapsed, the at least one crossbar clamp is stowed in the carrier, and the carrying strap is coupled to the exterior of the body portion.

A1. The carrier of A0, the at least one crossbar clamp comprising a first jaw having a substantially planar first portion and a curved second portion configured to engage a first surface of the crossbar of the vehicle rack;

a second jaw configured to engage a second surface of the crossbar, a proximal end portion of the second jaw being pivotably coupled to a proximal end portion of the first jaw;

a third jaw having a flange portion disposed opposite the planar first portion of the first jaw, a proximal end portion of the third jaw being pivotably coupled to the proximal end portions of the first and second jaws;

a clamp actuator configured to selectively urge a distal end portion of the second jaw toward a distal end portion of the first jaw and simultaneously to urge the distal end portion of the first jaw toward a distal end portion of the third jaw.

A2. The carrier of A1, wherein the clamp actuator is lockable.

A3. The carrier of A1, wherein the clamp actuator comprises a manual knob engaged on a first end of a threaded rod, the threaded rod pivotably coupled at a second end to the distal end portion of the third jaw.

A4. The carrier of A1, wherein the crossbar clamp is configured to engage a slot formed in the main body of the carrier by pinching a perimeter of the slot between the planar first portion of the first jaw and the flange portion of the third jaw.

A5. The carrier of any one of paragraphs A0 through A4, further comprising a tubular lining disposed in the hollow interior, wherein the tubular lining comprises a pliant material configured to protect a fishing rod housed therein.

A6. The carrier of A5, wherein an effective length of the tubular lining is configured to change as the tubular segments of the main body are extended and collapsed.

A7. The carrier of A5, wherein only a first end portion and a second end portion of the tubular lining are coupled to the main body of the carrier.

A8. The carrier of any one of paragraphs A0 through A7, the body portion further comprising a hollow housing disposed at the first end and enlarged relative to the tubular segments, such that the housing is configured to enclose a reel coupled to a fishing rod disposed in the carrier.

A9. The carrier of any one of paragraphs A0 through A8, wherein the door further comprises at least one clip configured to selectively retain the at least one crossbar clamp when the carrier is in the portable configuration.

A10. The carrier of any one of paragraphs A0 through A9, wherein each of the tubular segments comprises a respective slot configured to receive the at least one crossbar clamp therein.

A11. The carrier of A10, wherein each of the slots is a keyhole slot.

A12. The carrier of any one of paragraphs A0 through A11, wherein each of the tubular segments is less than approximately thirty inches long.

A13. The carrier of any one of paragraphs A0 through A12, wherein the tubular segments each have a respective detent mechanism, such that the tubular segments are releasably securable relative to each other.

A14. The carrier of any one of paragraphs A0 through A13, wherein the door comprises a lock configured to selectively secure the door in a closed position.

B0. A convertible carrier for fishing rods, the carrier comprising:

an elongate body portion having a plurality of telescoping tubular segments, such that an effective length of the body portion is selectively variable;

an inner lining coupled to the elongate body portion and configured such that an elongate object stowed within the body portion is separated from the tubular segments by the inner lining;

a housing coupled to an open end of the elongate body portion, the housing having a larger perimeter than each of the tubular segments;

a door pivotably coupled to the housing and configured to control access to an interior of the housing and the elongate body portion; and a crossbar clamp selectively attachable to the elongate body portion;

wherein the carrier is convertible between a mounted configuration, in which the crossbar clamp couples the body portion to a crossbar of a vehicle rack, and a portable configuration, in which the elongate body portion is collapsed, the crossbar clamp is stowed in the carrier, and a carrying strap is coupled to the carrier.

B1. The carrier of B0, the crossbar clamp comprising a first jaw having a substantially planar first portion and a curved second portion configured to engage a first surface of the crossbar of the vehicle rack;

a second jaw configured to engage a second surface of the crossbar, a proximal end portion of the second jaw being pivotably coupled to a proximal end portion of the first jaw;

a third jaw having a flange portion disposed opposite the planar first portion of the first jaw, a proximal end portion of the third jaw being pivotably coupled to the proximal end portions of the first and second jaws;

a clamp actuator configured to selectively urge a distal end portion of the second jaw toward a distal end portion of the first jaw and simultaneously to urge the distal end portion of the first jaw toward a distal end portion of the third jaw.

B2. The carrier of B1, wherein the clamp actuator is lockable.

B3. The carrier of B1, wherein the clamp actuator comprises a manual knob engaged on a first end of a threaded rod, the threaded rod pivotably coupled at a second end to the distal end portion of the third jaw.

B4. The carrier of B1, wherein the crossbar clamp is configured to engage a slot formed in the body portion of the carrier by pinching a perimeter of the slot between the planar first portion of the first jaw and the flange portion of the third jaw.

B5. The carrier of any one of paragraphs B0 through B4, wherein the inner lining comprises a pliant material configured to protect a fishing rod housed therein.

B6. The carrier of any one of paragraphs B0 through B5, wherein an effective length of the inner lining is configured to change as the tubular segments of the body portion are telescoped.

B7. The carrier of any one of paragraphs B0 through B6, wherein only a first end portion and a second end portion of the inner lining are coupled to the main body of the carrier.

B8. The carrier of any one of paragraphs B0 through B7, wherein the housing is configured to enclose a reel coupled to a fishing rod disposed in the carrier.

B9. The carrier of any one of paragraphs B0 through B8, wherein the door further comprises at least one clip configured to selectively retain the crossbar clamp when the carrier is in the portable configuration.

B10. The carrier of any one of paragraphs B0 through B9, wherein at least one of the tubular segments comprises a slot configured to receive the crossbar clamp therein.

B11. The carrier of B10, wherein the slot is a keyhole slot.

B12. The carrier of any one of paragraphs B0 through B11, wherein each of the tubular segments is less than approximately thirty inches long.

B13. The carrier of any one of paragraphs B0 through B12, wherein the tubular segments each have a respective detent mechanism, such that the tubular segments are releasably securable relative to each other.

B14. The carrier of any one of paragraphs B0 through B13, wherein the door comprises a lock configured to selectively secure the door in a closed position.

C0. A method for stowing one or more fishing rods, the method comprising:

resizing an effective length of a fishing rod carrier comprising a plurality of telescoping tubular segments extending from a reel housing;

retrieving one or more crossbar clamps from an interior of the fishing rod carrier;

installing the one or more crossbar clamps on the fishing rod carrier;

securing the fishing rod carrier to a vehicle rack by clamping the one or more crossbar clamps to a crossbar of the vehicle rack;

inserting a fishing rod into the fishing rod carrier via a hinged door on the reel housing, such that a rod portion of the fishing rod is disposed within the tubular segments and a reel portion of the fishing rod is disposed within the reel housing; and securing the fishing rod within the fishing rod carrier by locking the door of the reel housing using an integrated locking mechanism.

C1. The method of C0, wherein securing the fishing rod carrier to the vehicle rack further comprises locking the crossbar clamp using a locking mechanism integrated into the clamp.

C2. The method of C1, wherein locking the crossbar clamp automatically locks the clamp to the fishing rod carrier.

C3. The method of any one of paragraphs C0 through C2, wherein disposing the fishing rod in the fishing rod carrier further comprises placing a rod portion of the fishing rod into a continuous interior lining coupled to the tubular segments.

C4. The method of any one of paragraphs C0 through C3, further comprising:

unclamping and removing the fishing rod carrier from the vehicle rack;

removing the crossbar clamp from the fishing rod carrier;

stowing the crossbar clamp in an interior of the fishing rod carrier; and attaching a carrying strap to an exterior of the fishing rod carrier.

C5. The method of C4, wherein stowing the crossbar clamp in the interior of the fishing rod carrier comprises coupling the crossbar clamp to a clip protruding from an inner surface of the door.

D0. A carrier assembly for carrying fishing rods, comprising:

a plurality of tubular segments including an outer tubular segment and at least one inner tubular segment disposed coaxially with one another in a telescoping configuration, such that the carrier assembly is transitionable between a collapsed state and an extended state;

a close-able aperture disposed at a first end of the carrier assembly, through which a fishing rod can be inserted or removed;

first and second slots respectively disposed in first and second ones of the tubular segments; and first and second clamps respectively configured to pass through the first and second slots and each configured to securely attach to a crossbar of an automobile rooftop carrier rack, thereby securing the carrier assembly to the rooftop carrier rack.

E0. A carrier assembly for carrying fishing rods, comprising:

a plurality of inner tubular segments;

an outer tubular segment including an aperture disposed at one end capable of opening to allow insertion of a fishing rod and closing to retain the fishing rod within the carrier assembly;

first and second clamps each configured to pass through a slot formed in a respective one of the tubular segments and to be secured to a crossbar of a car-top rack, thereby securing the carrier assembly to the car-top rack; and a locking mechanism operable for selectively preventing the one or more inner tubular segments from telescoping;

wherein the tubular segments are disposed coaxially with each other in a telescoping configuration, such that the carrier assembly is transitionable between a collapsed state wherein the inner tubular segments are nested concentrically within the outer tubular segment, and an extended state wherein the tubular segments are at least partially nonoverlapping with the outer tubular segment.

F0. A carrier assembly for carrying fishing rods, comprising:

a plurality of inner tubular segments, each of the inner tubular segments including a detent opening at a first end and a depressable detent boss at a second end;

an outer tubular segment including an aperture disposed at a first end and capable of opening to allow insertion of a fishing rod and closing to retain the fishing rod within the carrier assembly, a reel housing disposed at the first end and configured to contain a reel attached to the fishing rod, and detent openings disposed at the first end and at a second end;

a key-operated lock capable of securing the aperture such that it remains closed; and first and second clamps each configured to pass through a slot formed in a respective one of the tubular segments and to be secured to a crossbar of a car-top rack, thereby securing the carrier assembly to the car-top rack;

wherein the tubular segments are disposed coaxially with each other in a telescoping configuration, such that the carrier assembly is transitionable between a collapsed state wherein the inner tubular segments are nested concentrically within the outer tubular segment, and an extended state wherein the inner tubular segments are at least partially nonoverlapping with the outer tubular segment;

wherein the depressable detent bosses and detent openings disposed on adjacent ones of the tubular segments are configured to secure the tubular segments in the extended state, and the detent opening at the first end of the outer tubular segment is configured to hold all of the depressable detent bosses when the tubular segments are in the collapsed state;

wherein the outer tubular segment includes a releasable fastening mechanism configured to selectively prevent depression of the depressable detent bosses when the tubular segments are in the collapsed state; and wherein a protective sleeve of elastic material lines the tubular segments and is configured to stretch and relax such that it contains the fishing rod within the tubular segments in both the collapsed state and the extended state.

G0. A method for stowing one or more fishing rods, the method comprising:

resizing an effective length of a fishing rod carrier comprising a plurality of telescoping tubular segments extending from a reel housing;

securing the fishing rod carrier to a vehicle rack by clamping one or more crossbar clamps of the carrier to a crossbar of the vehicle rack;

inserting a fishing rod into the fishing rod carrier via a hinged door on the reel housing, such that a rod portion of the fishing rod is disposed within the tubular segments and a reel portion of the fishing rod is disposed within the reel housing; and securing the fishing rod within the fishing rod carrier by locking the door of the reel housing using an integrated locking mechanism;

wherein inserting the fishing rod into the fishing rod carrier further comprises placing a rod portion of the fishing rod into a continuous interior lining coupled to the tubular segments.

G1. The method of G0, wherein securing the fishing rod carrier to the vehicle rack further comprises locking the crossbar clamp using a locking mechanism integrated into the clamp.

G2. The method of G1, wherein locking the crossbar clamp automatically locks the clamp to the fishing rod carrier.

G3. The method of any one of paragraphs G0 through G2, further comprising: retrieving one or more crossbar clamps from an interior of the fishing rod carrier;

and installing the one or more crossbar clamps on the fishing rod carrier.

G4. The method of any one of paragraphs G0 through G3, further comprising:

unclamping and removing the fishing rod carrier from the vehicle rack;

removing the crossbar clamp from the fishing rod carrier;

stowing the crossbar clamp in an interior of the fishing rod carrier; and attaching a carrying strap to an exterior of the fishing rod carrier.

G5. The method of G4, wherein stowing the crossbar clamp in the interior of the fishing rod carrier comprises coupling the crossbar clamp to a clip protruding from an inner surface of the door.

Advantages, Features, and Benefits

The different embodiments and examples of the convertible fishing rod carriers described herein provide several advantages over known solutions. For example, illustrative embodiments and examples described herein allow an effective length of the carrier to be resized manually by the user, thereby accommodating a length of the carried item (e.g., a rigged, partially rigged, or disassembled fly rod). Additionally, and among other benefits, illustrative embodiments and examples described herein are convertible between a portable configuration, in which the carrier can be transported manually, and a mounted configuration, in which the carrier is securely coupled to a vehicle rack. Additionally, and among other benefits, illustrative embodiments and examples described herein facilitate changing between the portable and the mounted configurations without the use of tools. Additionally, and among other benefits, illustrative embodiments and examples described herein include a clamp locking feature configured to prevent removal of the carrier from the rack by simultaneously securing the clamp to both the carrier and the rack.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A convertible carrier for fishing rods, the carrier comprising:
   an elongate body portion having a first end, a closed second end, and an outer housing defining a hollow interior extending axially from the first end to the second end, the outer housing including a plurality of telescoping tubular segments, such that the body portion is axially collapsible and extendable;
   a tubular lining disposed in the hollow interior, wherein the tubular lining comprises a pliant material configured to protect a fishing rod housed therein, and wherein an effective length of the tubular lining is configured to change as the tubular segments of the body portion are extended and collapsed;
   a door disposed at the first end of the body portion, the door configured to selectively permit access to the interior of the body portion; and
   at least one crossbar clamp comprising:
      a first jaw having a substantially planar first portion and a curved second portion configured to engage a first surface of a crossbar of a vehicle rack;
      a second jaw configured to engage a second surface of the crossbar, a proximal end portion of the second jaw being pivotably coupled to a proximal end portion of the first jaw;
      a third jaw having a flange portion disposed opposite the planar first portion of the first jaw, a proximal end portion of the third jaw being pivotably coupled to the proximal end portions of the first and second jaws; and
      a clamp actuator configured to selectively urge a distal end portion of the second jaw toward a distal end portion of the first jaw and simultaneously to urge the distal end portion of the first jaw toward a distal end portion of the third jaw;
   wherein the carrier is convertible between a mounted configuration, in which the at least one crossbar clamp is coupled to the body portion and couples the body portion to the crossbar of the vehicle rack, and a portable configuration, in which the elongate body portion is collapsed, and the at least one crossbar clamp is stowed in the carrier.

2. The carrier of claim 1, wherein the crossbar clamp is configured to engage a slot formed in the main body of the carrier by pinching a perimeter of the slot between the planar first portion of the first jaw and the flange portion of the third jaw.

3. The carrier of claim 1, the body portion further comprising a hollow housing disposed at the first end and enlarged relative to the tubular segments, such that the housing is configured to enclose a reel coupled to a fishing rod disposed in the carrier.

4. The carrier of claim 1, wherein the door further comprises at least one clip configured to selectively retain the at least one crossbar clamp when the carrier is in the portable configuration.

5. The carrier of claim 1, wherein each of the tubular segments comprises a respective keyhole slot configured to receive the at least one crossbar clamp therein.

6. A convertible carrier for fishing rods, the carrier comprising:
   an elongate body portion having a first end, a closed second end, and an outer housing defining a hollow interior extending axially from the first end to the second end, the outer housing including a plurality of telescoping tubular segments, such that the body portion is axially collapsible and extendable;
   a door disposed at the first end of the body portion, the door configured to selectively permit access to the interior of the body portion; and
   at least one crossbar clamp comprising a first jaw having a substantially planar first portion and a curved second portion configured to engage a first surface of a crossbar of a vehicle rack, a second jaw configured to engage a second surface of the crossbar, a proximal end portion of the second jaw being pivotably coupled to a proximal end portion of the first jaw, and a third jaw having a flange portion disposed opposite the planar first portion of the first jaw, a proximal end portion of the third jaw being pivotably coupled to the proximal end portions of the first and second jaws, and a clamp actuator configured to selectively urge a distal end portion of the second jaw toward a distal end portion of the first jaw and simultaneously to urge the distal end portion of the first jaw toward a distal end portion of the third jaw;

wherein the carrier is convertible between a mounted configuration, in which the at least one crossbar clamp is coupled to the body portion and couples the body portion to the crossbar of the vehicle rack, and a portable configuration, in which the elongate body portion is collapsed, and the at least one crossbar clamp is stowed in the carrier.

7. The carrier of claim 6, wherein the clamp actuator comprises a manual knob engaged on a first end of a threaded rod, the threaded rod pivotably coupled at a second end to the distal end portion of the third jaw.

8. The carrier of claim 6, wherein the crossbar clamp is configured to engage a slot formed in the main body of the carrier by pinching a perimeter of the slot between the planar first portion of the first jaw and the flange portion of the third jaw.

9. The carrier of claim 6, the body portion further comprising a hollow housing disposed at the first end and enlarged relative to the tubular segments, such that the housing is configured to enclose a reel coupled to a fishing rod disposed in the carrier.

10. The carrier of claim 6, wherein the door further comprises at least one clip configured to selectively retain the at least one crossbar clamp when the carrier is in the portable configuration.

11. The carrier of claim 6, wherein each of the tubular segments comprises a respective keyhole slot configured to receive the at least one crossbar clamp therein.

12. A convertible carrier for fishing rods, the carrier comprising:

an elongate body portion having a plurality of telescoping tubular segments, such that an effective length of the body portion is selectively variable;

an inner lining coupled to the elongate body portion and configured such that an elongate object stowed within the body portion is separated from the tubular segments by the inner lining;

a housing coupled to an open end of the elongate body portion, the housing having a larger perimeter than each of the tubular segments;

a door pivotably coupled to the housing and configured to control access to an interior of the housing and the elongate body portion; and a crossbar clamp selectively attachable to the elongate body portion, the crossbar clamp including a first jaw having a substantially planar first portion and a curved second portion configured to engage a first surface of a crossbar of a vehicle rack, a second jaw configured to engage a second surface of the crossbar, a proximal end portion of the second jaw being pivotably coupled to a proximal end portion of the first jaw, a third jaw having a flange portion disposed opposite the planar first portion of the first jaw, a proximal end portion of the third jaw being pivotably coupled to the proximal end portions of the first and second jaws, and a clamp actuator configured to selectively urge a distal end portion of the second jaw toward a distal end portion of the first jaw and simultaneously to urge the distal end portion of the first jaw toward a distal end portion of the third jaw;

wherein the carrier is convertible between a mounted configuration, in which the crossbar clamp is coupled to the body portion and couples the body portion to the crossbar of the vehicle rack, and a portable configuration, in which the elongate body portion is collapsed, and the crossbar clamp is stowed in the carrier.

13. The carrier of claim 12, wherein the crossbar clamp is configured to engage a slot formed in the body portion of the carrier by pinching a perimeter of the slot between the planar first portion of the first jaw and the flange portion of the third jaw.

14. The carrier of claim 12, wherein the inner lining comprises a pliant material configured to protect a fishing rod housed therein, and wherein an effective length of the inner lining is configured to change as the tubular segments of the body portion are telescoped.

15. The carrier of claim 12, wherein the door further comprises at least one clip configured to selectively retain the crossbar clamp when the carrier is in the portable configuration.

* * * * *